United States Patent [19]

Denoncourt

[11] 3,813,604

[45] May 28, 1974

[54] DIGITAL DISCRIMINATOR

[75] Inventor: Gilles J. Denoncourt, St. Dorothee, Quebec, Canada

[73] Assignee: Canadian Marconi Company, Montreal, Quebec, Canada

[22] Filed: Oct. 4, 1972

[21] Appl. No.: 294,968

[52] U.S. Cl. .................. 329/122, 307/232, 328/133, 329/106

[51] Int. Cl. .................. H03d 3/18

[58] Field of Search .................. 329/106, 122, 112; 307/232; 328/133, 134; 332/14

[56] References Cited

UNITED STATES PATENTS

| | | | |
|---|---|---|---|
| 3,521,173 | 7/1970 | Farley | 328/134 |
| 3,548,327 | 12/1970 | Vermeulen | 307/232 X |
| 3,684,967 | 8/1972 | Kelly | 307/232 X |
| 3,710,140 | 1/1973 | Volmerange | 307/232 X |

FOREIGN PATENTS OR APPLICATIONS

| | | | |
|---|---|---|---|
| 765,685 | 1/1957 | Great Britain | 328/134 |

*Primary Examiner*—Alfred L. Brody
*Attorney, Agent, or Firm*—Alan Swabey & Co.

[57] ABSTRACT

The disclosure relates to a phase and frequency discriminator which is especially adaptable to digital communication receiver systems. The discriminator consists of a duty cycle generator having two input terminals. Each one of the terminals is fed from a different pulse generator, and one of the pulse generators is activated by the input signal while the other is activated by the second input signal. One of the pulse generators activates the duty cycle generator while the other one deactivates it. Thus, the output of the duty cycle generator is a signal whose duty cycle is proportional to the phase relation between the two signals. In accordance with the disclosure, if the second signal is derived from a VCO whose input is controlled by the duty cycle, the second signal is brought into phase and frequency synchronism with the first signal.

1 Claim, 5 Drawing Figures

DIGITAL DISCRIMINATOR

FIELD OF THE INVENTION

This invention relates to a digital discriminator. More specifically, this invention relates to a phase or frequency discriminator for use in digital systems and employing digital circuits and techniques.

BACKGROUND OF THE INVENTION

1. Statement of Prior Art

In digital systems such as digital communications systems, synchronism must be provided between the incoming digital signal and internal subsystems. In order to provide this synchronism, it is common to provide a pulse generator which is synchronized to the incoming digital system. The output of this generator is then fed to the various sub-systems which must be synchronised.

In order to insure synchronization of the generator, a discriminator which compares the incoming signal's phase and frequency to the phase and frequency of the generator is required. The output of the discriminator can be used to adjust the phase and frequency of the generator in a phase locked loop as is well known in the art. The instant disclosure teaches such a discriminator.

2. Summary of the Invention

It is a purpose of the invention to provide a digital discriminator to be used in a phase locked loop which will acquire and track with phase coherence to an input frequency.

It is a further purpose of the invention to provide a digital discriminator to be used in a phase locked loop which will acquire and track with frequency coherence to an input frequency.

In accordance with the invention, a digital discriminator comprises a duty cycle generator having a first input terminal and a second input terminal; said first input terminal comprising means for receiving said first signal; said second terminal comprising means for receiving said second signal; said generator being activated when a predetermined recurring portion of said first signal is applied at said first input terminal; said generator being deactivated when a corresponding recurring portion of said second signal is applied at said second input terminal; whereby the output of said duty cycle generator is a signal whose duty cycle is proportional to the phase of frequency relation between said first and said second signals.

BRIEF DESCRIPTION OF THE DRAWINGS

The invention will be better understood by examination of the following description taken together with the accompanying drawings in which.

DESCRIPTION OF PREFERRED EMBODIMENTS OF THE INVENTION

Figure 1:
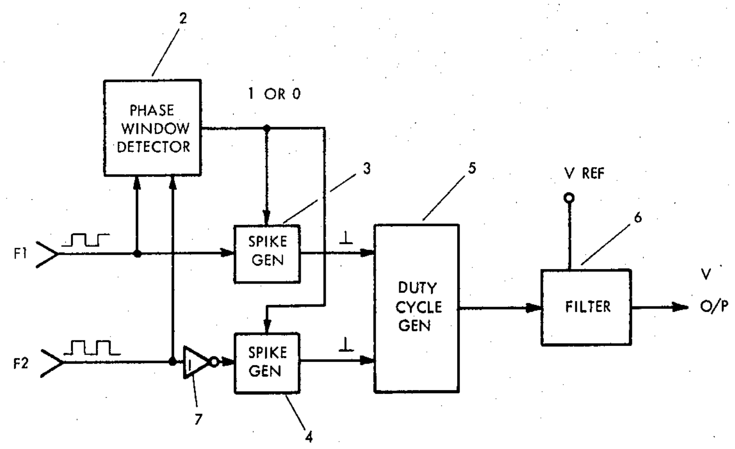
FIG. 1 is a schematic representation of the principles of the invention.

Referring now to FIG. 1, $F_1$ and $F_2$ are two pulse trains of which either can comprise a digital received signal or the output of a pulse generator. The pulses are fed over one set of leads to a quadrature detector 2, the purpose of which will be explained below.

The pulses $F_1$ and $F_2$ are also fed to spike generators 3 and 4, with $F_2$ being fed to 4 through an invertor 7, and the outputs of the spike generators are fed to a duty cycle generator 5. The output of the duty cycle generator is filtered by the filter 6, which is connected to a source of reference voltage $V_{ref}$, to provide an output which is dependent on the phase of frequency difference between $F_1$ and $F_2$.

In operation, the discriminator works as follows: The spike generators are actuated by either the leading edge, or some other portion, of each pulse in the pulse trains $F_1$ and $F_2$ to produce a spike at the output thereof. The spikes actuate the duty cycle generator, one of the spikes turning the generator on to provide a high level at the output, the next one turning the generator off to provide a low level at the output, the third spike turning the generator on again, and so forth. When $F_1$ and $F_2$ are in phase, and when the leading edge actuates the pulse generators, then the first leading edge will actuate its associated spike generator and set the duty cycle generator to its high level. The next leading edge will arrive at the other spike generator 180° later (because of the inversion of $F_2$ relative to $F_1$) and reset the duty cycle generator to its low level. The third leading edge will arrive at the first spike generator 180° later (or 360° after the first leading edge) and set the duty cycle generator to its high level.

Thus, with $F_1$ and $F_2$ in phase, the output of the duty cycle generator is a pulse train with the same frequency as $F_1$ and $F_2$ and with a duty cycle of 50 percent. The output of the filter 6 will be $V_{ref}/2$.

When $F_1$ and $F_2$ are not in phase, then the separation between leading edges will be more or less than 180° so that the duty cycle of the resulting pulse train will be different than 50 percent. As a result, the output of the filter 6 will be greater or less than $V_{ref}$/and the extent of the difference will be indicative of the amount of phase difference.

It will, of course, be appreciated that the same mechanism, operating in the same way, will measure the frequency difference between $F_1$ and $F_2$.

The phase window detector 2 (in the illustrated embodiment, a quadrature detector is employed, and, accordingly, this second term will be used hereinafter) is designed to detect a phase difference of more than 90° between the two pulse trains. When such a phase difference is detected, the spike generators are inhibited by a signal from the quadrature detectors so that the output of the duty cycle generator is retained low. In this case, the output of the filter will remain at the last retained position high or low depending on the sources of the last received spike. This position is high or low in dependence on whether the frequency of the first signal is greater or smaller than the second signal.

Figure 2:
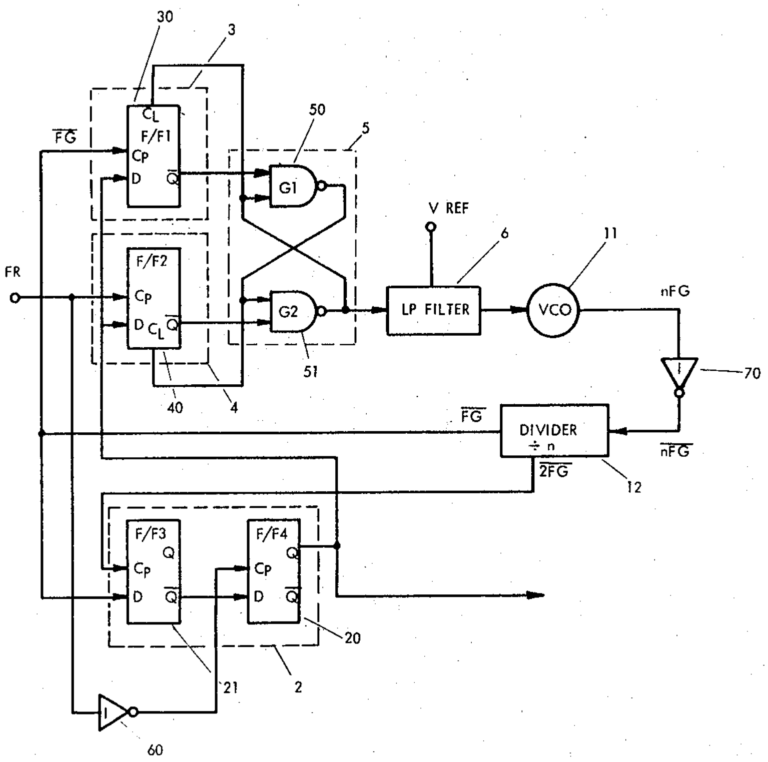
FIG. 2 illustrates a preferred embodiment of the invention.

Referring now to FIG. 2, FR is the received frequency to which the output of the VCO 11 must be synchronized. In the embodiment illustrated in FIG. 2, VCO 11 produces a frequency nFG, but it is this frequency divided down by $n$, i.e., the frequency FG, which serves as the synchronizing frequency, and which must consequently be synchronized with FR.

The spike generator 3 consists of a flip-flop 30, and the spike generator 4 consists of a flip-flop 40. The quadrature detector 2 consists of two flip-flops 20 and 21, and the duty cycle generator comprises two NAND gates 50 and 51 connected in a set-reset arrangement. A frequency divider 12 provides a signal with a frequency $\overline{2FG}$ at one output terminal, and a signal with a frequency $\overline{FG}$ at its other output terminal. The symbol $\overline{FG}$ indicates a phase shift of 180° as is well known in the art. Invertor 60 shifts the phase of FR by 180°, while invertor 70 shifts the phase of nFG by 180°. The flip-flops are D-type flip-flops as well known in the art.

Figure 3:
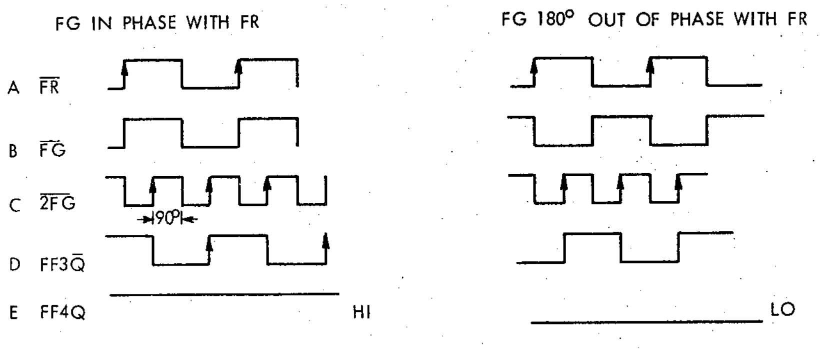
FIGS. 3 and 4 comprise graphs which illustrate the operation of the invention.

In operation, the discriminator works as follows: Considering first the operation of the quadrature detector and referring to FIGS. 2 and 3, a signal at a frequency $\overline{FG}$ is fed to the D terminal of flip-flop 21 and a signal at a frequency $\overline{2FG}$ is fed to the Cp terminal of this flip-flop. FIG. 3 illustrates the phase relationship of these frequencies with FR when FG is in phase with FR and when FG is 180° out of phase with FR. The output at the $\overline{Q}$ terminal of flip-flop 21 is shown at D of FIG. 3. (It is, of course, understood that a D-type flip-flop is clocked by the leading edge of an input pulse). This output is fed to the D terminal of flip-flop 20, while a $\overline{FR}$ signal clocks the flip-flop 20. As can be seen in FIG. 3, when FG is in phase with FR, or is within 90° of FR, then flip-flop 20 will always be clocked when the D terminal is high so that the output at the Q terminal of flip-flop 20 will remain high. However, when FG is more than 90° out of phase with FR, then flip-flop 20 will always be clocked when the D terminal of the flip-flop is low, so that the output at its Q terminal will remain low. Thus the quadrature detector provides a high output when the phase difference between FR and FG is less than 90°, and a low output when the phase difference is greater than 90°.

The purpose of the quadrature detector is to limit the action of the discriminator to avoid ambiguities which exist at phase differences of 180°. It will, of course, be recognized that means other than the D flip-flops 21 and 22 could be used in the quadrature detection function, and the illustrated circuit is only a preferred embodiment. In addition, although the instant disclosure teaches a 'window' of ± 90°, depending on the requirement, by the expedient of rearranging the circuitry.

Figure 4:
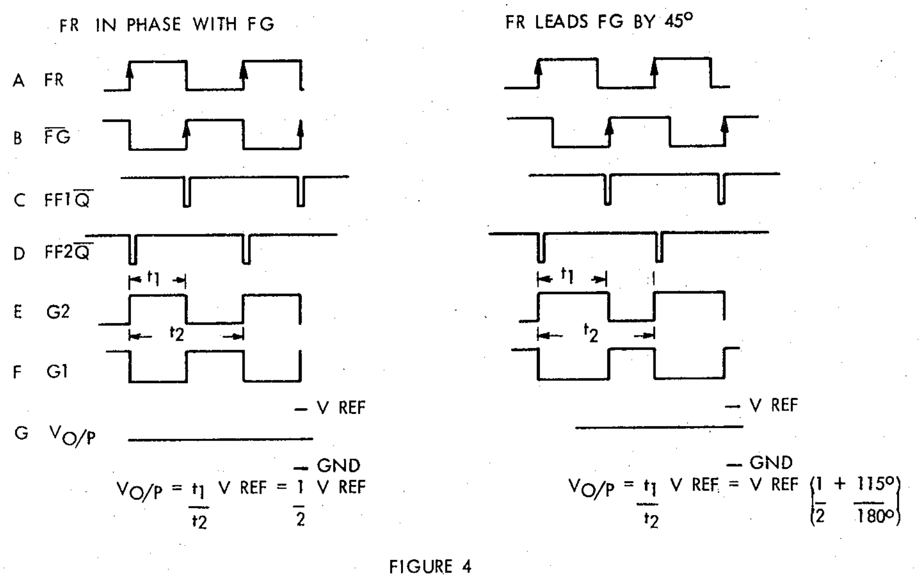

Referring now to FIGS. 2 and 4, D flip-flops 30 and 40 will provide usable outputs only when the D terminals thereof are high, i.e., considering the action of the quadrature detector, only when FR and FG are within ± 90° having regard to the phase relationship thereof. FIG. 4 illustrates graphically the outputs at various points in the discriminator when, FR and FG are in phase and, when FG is 45° out of phase. As can be seen at FIGS. 4C and 4D the output at the $\overline{Q}$ terminals of 30 and 40, when their D terminals are high, and when they receive a clocking pulse, is a negative going spike. These spikes toggle the set-reset flip-flop achieved by cross-coupling the NAND gates $G_1$ and $G_2$, so that the output at $G_2$ is a waveform whose duty cycle is proportional to the phase relationship between FR and FG. In the illustrated embodiment, the duty cycle is 50 percent when FR and FG are in phase.

Figure 5:
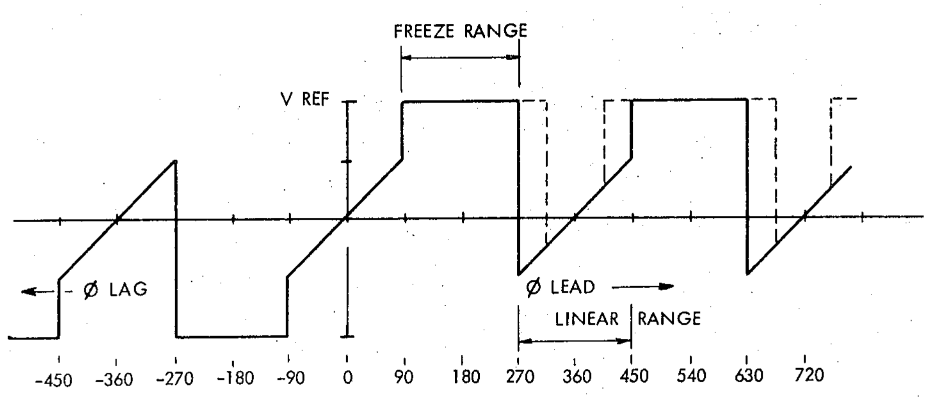
FIG. 5 is a characteristic transfer curve of the inventive discriminator.

The output of $G_2$ is fed, via the filter 6, to VCO 11. When the frequencies are in phase, the output of filter 6 is $F_{ref}/2$. The output of the filter will be greater or less than the above when the frequencies are out of phase depending on whether FR is leading or lagging FG. In the illustrated embodiment, when FR leads FG, the output of filter 6 will be greater than $F_{ref}/2$. FIG. 5, which will be discussed more fully below, shows the D.C. output of the discriminator of the preferred embodiment. It will, of course, be appreciated that this relationship could be reversed or otherwise altered without departing from the spirit of the invention.

The output of the filter, as mentioned above, is fed to the VCO 11 to adjust FG in such a direction as to bring it into phase with FR as is well known in the art.

It will be apparent that the duty cycle generator 5 can comprise means other than the set-reset flip-flop illustrated in FIG. 4. Thus, other toggling type flip-flops, such as a J-K flip-flop, could be employed.

In the above description, it was tacitly assumed that FR and FG are equal. This condition is not necessary for the operation of the inventive discriminator. Two unequal frequencies exhibit a phase relation which is continuously changing. With one of the frequencies established as a reference frequency (FR), the other frequency (FG) can be said to have a phase relation with the reference which is increasingly leading when FG is greater than FR, and increasingly lagging when FG is less than FR. That is, in the first instance above, FG will have a phase difference which is increasingly leading the phase of FR whereas in the second instance, FG will have a phase which is increasingly lagging the phase of FR. In the leading situation, the phase difference will increase from 0° to 360° and so on, whereas in the lagging situation, the phase will digress from 360° downwards.

The phase discriminator curve illustrated in FIG. 5 encompasses the dynamic range beyond 360°.

When the FR and FG frequencies are not equal, the discriminator will respond to the chaning phase relations to provide an output at filter 6 which will tend to adjust the frequency of FG towards FR.

Considering now FIG. 5, the discontinuities at 90° exist because, as explained above, at the moment FG is more than 90° away from FR, the pulse generator stops and the set-reset flip-flop freezes at the last established state of 1 or 0.

The average DC value over a complete cycle at the discriminator output when the phase is leading is (see FIG. 5):

$V_{ref} \times$ freeze range + linear range $\times V_{ref}/2/360°$

For a 90° quad detector, the freeze range = linear range = 180°.

Thus,

Avg. $O/P = V_{ref} \times ½ + V_{ref} \times ½ = 3/4\ V_{ref}$

The output average DC value can, of course, be increased if the frequency range is increased above 180° as per the dotted lines in FIG. 5.

Although preferred embodiments have been described in the foregoing, this was for the purpose of illustrating, but not limiting the invention. Various modifications which will come readily to the mind of one skilled in the art will come within the scope of the invention as defined in the appended claims.

I claim:

1. A discriminator for detecting phase or frequency differences between a first signal at a first frequency and a second signal at a second frequency; and comprising a duty cycle generator having a first input terminal and a second input terminal; a first pulse generator having an input terminal and an output terminal; and a second pulse generator having an input terminal and an output terminal; the input terminal of said first pulse generator being adapted to receive said first signal, and the output terminal of said first pulse generator being connected to said first input terminal of said duty cycle generator; the input terminal of said second pulse generator being adapted to receive the inverse of said second signal, and the output terminal of said second pulse generator being connected to the second input terminal of said duty cycle generator; wherein said first pulse generator comprises a first D flip-flop having a D input terminal and a CP input terminal and a Q output terminal and a $\overline{Q}$ output terminal; and wherein said second pulse generator comprises a second D flip-flop having a D input terminal and a CP input terminal and a Q output terminal and a $\overline{Q}$ output terminal; the CP terminals of said D flip-flops comprising the input terminals of said pulse generators, the $\overline{Q}$ output terminals of said D flip-flops comprising the output terminals of said D flip-flops; said generator being activated when a predetermined recurring portion of said first signal is applied at said input terminal of said first pulse generator; said generator being deactivated when a corresponding recurring portion of said inverted second signal is applied at said input terminal of said second pulse generator; whereby the output of said duty cycle generator is a signal whose duty cycle is proportional to the phase or frequency relation between said first and said second signals, and further comprising a quadrature detector adapted to detect phase differences greater than plus or minus 90°; said quadrature detector comprising a third D flip-flop having a D input terminal and a CP input terminal, and a Q output terminal and a $\overline{Q}$ output terminal, said quadrature detector further comprising a fourth D flip-flop comprising a D input terminal and a CP input terminal and a Q output terminal and a $\overline{Q}$ output terminal; said discriminator further comprising an oscillator for providing a third signal at a frequency n times the second frequency, where n is an integer number; phase shift means connected to the output of the oscillator to shift the phase of the third signal by 180°; frequency divider means having an input terminal and two output terminals, the input terminal of the frequency divider means being connected to said phase shift means, one of the output terminals of said frequency divider means providing said second signal, shifted by 180°, the other output terminal of said frequency divider means providing a signal at twice said second frequency; said one output terminal of said frequency divider means being applied to the D terminal of said third D flip-flop; the output of said other terminal of said frequency divider means being applied to the CP input terminal of said third D flip-flop; second phase shift means connected to the CP terminal of said fourth D flip-flop; said first input signal being applied to said second phase shift means; said $\overline{Q}$ terminal of said third D flip-flop being connected to the D terminal of said fourth D flip-flop; the Q output terminal of said fourth D flip-flop being connected to the D terminals of said first and second flip-flops.

* * * * *